(12) United States Patent
Lin et al.

(10) Patent No.: US 9,390,340 B2
(45) Date of Patent: *Jul. 12, 2016

(54) IMAGE-BASED CHARACTER RECOGNITION

(71) Applicant: A9.com, Inc., Palo Alto, CA (US)

(72) Inventors: Xiaofan Lin, Palo Alto, CA (US);
Arnab Sanat Kumar Dhua, Mountain View, CA (US); Douglas Ryan Gray, Mountain View, CA (US); Yu Lou, Stanford, CA (US)

(73) Assignee: A9.com, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,696

(22) Filed: May 26, 2015

(65) Prior Publication Data

US 2015/0254507 A1    Sep. 10, 2015

Related U.S. Application Data

(63) Continuation of application No. 13/688,772, filed on Nov. 29, 2012, now Pat. No. 9,043,349.

(51) Int. Cl.
*G06F 17/30* (2006.01)
*G06K 9/18* (2006.01)
(Continued)

(52) U.S. Cl.
CPC ............ *G06K 9/18* (2013.01); *G06F 17/30253* (2013.01); *G06K 9/325* (2013.01); *G06K 9/6292* (2013.01); *G06K 2209/01* (2013.01)

(58) Field of Classification Search
CPC . G06K 9/00463; G06K 9/18; G06K 9/00986; G06K 9/6253; G06K 9/00852; G06K 9/6255; G06K 9/6211; G06K 9/6292; G06K 9/325; G06K 2209/01; G06K 9/00; G06F 17/30386; G06F 17/30477; G06F 17/30256; G06F 17/30047; G06F 17/24; G06F 17/30253; G10L 15/00; G10L 15/005; G06Q 30/0256; G06Q 30/0623

USPC .......... 707/758, 728, 723, E17.014; 382/257, 382/276, 181, 176, 168, 229, 182, 309, 217, 382/138, 107, 100, 305, 203, 154, 187
See application file for complete search history.

(56) References Cited

U.S. PATENT DOCUMENTS 3,001,439 A    9/1961  Rouy
4,876,457 A   10/1989  Bose
(Continued)

FOREIGN PATENT DOCUMENTS

CN    101010693    8/2007
CN    101231662    7/2008
(Continued)

OTHER PUBLICATIONS

Bindu Philip & R. D Sudhaker Samuel—"A Novel Bilingual OCR System based on Column—Stochastic Features and SVM Classifier for the Specially Enabled"—Published in: Emerging Trends in Engineering and Technology (ICETET), 2009 2nd International Conference on—Date of Conference: Dec. 16-18, 2009—pp. 252-257.*

(Continued)

*Primary Examiner* — Anh Ly
(74) *Attorney, Agent, or Firm* — Hogan Lovells US, LLP

(57) ABSTRACT

Various embodiments enable a device to perform tasks such as processing an image to recognize and locate text in the image, and providing the recognized text an application executing on the device for performing a function (e.g., calling a number, opening an internet browser, etc.) associated with the recognized text. In at least one embodiment, processing the image includes substantially simultaneously or concurrently processing the image with at least two recognition engines, such as at least two optical character recognition (OCR) engines, running in a multithreaded mode. In at least one embodiment, the recognition engines can be tuned so that their respective processing speeds are roughly the same. Utilizing multiple recognition engines enables processing latency to be close to that of using only one recognition engine.

17 Claims, 6 Drawing Sheets

(51) Int. Cl.
*G06K 9/32* (2006.01)
*G06K 9/62* (2006.01)

(56) References Cited

U.S. PATENT DOCUMENTS

| | | | |
|---|---|---|---|
| 5,611,000 A | 3/1997 | Szeliski et al. | |
| 5,694,491 A | 12/1997 | Brill et al. | |
| 5,717,781 A | 2/1998 | Ebel et al. | |
| 5,754,978 A | 5/1998 | Perez-Mendez et al. | |
| 5,855,000 A | 12/1998 | Waibel et al. | |
| 5,974,159 A | 10/1999 | Lubin | |
| 5,983,218 A | 11/1999 | Syeda-Mahmood | |
| 6,075,905 A | 6/2000 | Herman et al. | |
| 6,307,959 B1 | 10/2001 | Mandelbaum et al. | |
| 6,351,574 B1* | 2/2002 | Yair | G06K 9/033 382/311 |
| 6,446,060 B1 | 9/2002 | Bergman et al. | |
| 6,580,811 B2 | 6/2003 | Maurer et al. | |
| 6,668,074 B1 | 12/2003 | Wilson | |
| 6,671,404 B1 | 12/2003 | Kawatani et al. | |
| 6,941,016 B1 | 9/2005 | Wagman et al. | |
| 7,003,161 B2 | 2/2006 | Tessadro | |
| 7,072,872 B2 | 7/2006 | Caid et al. | |
| 7,109,987 B2 | 9/2006 | Goel et al. | |
| 7,206,437 B2 | 4/2007 | Kramer et al. | |
| 7,240,062 B2 | 7/2007 | Andersen et al. | |
| 7,251,637 B1 | 7/2007 | Caid et al. | |
| 7,650,035 B2 | 1/2010 | Vincent et al. | |
| 7,742,642 B2 | 6/2010 | Goldstein | |
| 7,894,689 B2 | 2/2011 | Liu et al. | |
| 8,009,928 B1* | 8/2011 | Manmatha | G06K 9/325 382/173 |
| 8,037,043 B2 | 10/2011 | Zoeter | |
| 8,060,609 B2* | 11/2011 | Banger | G06F 17/30781 705/14.4 |
| 8,126,247 B2 | 2/2012 | Chiang et al. | |
| 8,126,272 B2 | 2/2012 | Carr et al. | |
| 8,139,894 B2* | 3/2012 | Nestares | G06K 9/3208 382/114 |
| 8,175,388 B1 | 5/2012 | Fisher | |
| 8,184,155 B2 | 5/2012 | Ke | |
| 8,214,387 B2 | 7/2012 | King | |
| 8,406,507 B2 | 3/2013 | Ruzon et al. | |
| 8,644,610 B1 | 2/2014 | Ramkumar et al. | |
| 9,043,349 B1 | 5/2015 | Lin et al. | |
| 9,147,275 B1 | 9/2015 | Hyde-Moyer et al. | |
| 2002/0051575 A1 | 5/2002 | Myers et al. | |
| 2002/0181745 A1 | 12/2002 | Hu | |
| 2003/0037097 A1 | 2/2003 | Meyer et al. | |
| 2003/0208502 A1 | 11/2003 | Lin | |
| 2003/0216913 A1 | 11/2003 | Keely et al. | |
| 2004/0057619 A1 | 3/2004 | Lim et al. | |
| 2004/0088291 A1 | 5/2004 | Furuhashi | |
| 2004/0255218 A1 | 12/2004 | Tada et al. | |
| 2005/0002571 A1 | 1/2005 | Hiraga et al. | |
| 2005/0060273 A1 | 3/2005 | Andersen et al. | |
| 2005/0099406 A1 | 5/2005 | Pettiross et al. | |
| 2005/0131686 A1 | 6/2005 | Yamamoto et al. | |
| 2005/0180632 A1 | 8/2005 | Aradhye et al. | |
| 2005/0240407 A1 | 10/2005 | Simske et al. | |
| 2005/0271304 A1 | 12/2005 | Retterath et al. | |
| 2006/0013450 A1 | 1/2006 | Shan et al. | |
| 2006/0045348 A1 | 3/2006 | Kiros et al. | |
| 2006/0120629 A1 | 6/2006 | Myers et al. | |
| 2006/0212856 A1 | 9/2006 | Simske et al. | |
| 2006/0262976 A1 | 11/2006 | Hart et al. | |
| 2006/0285746 A1 | 12/2006 | Yacoub et al. | |
| 2007/0033026 A1 | 2/2007 | Bartosik et al. | |
| 2007/0046645 A1 | 3/2007 | Hirota et al. | |
| 2007/0047767 A1 | 3/2007 | Watabe | |
| 2007/0172117 A1 | 7/2007 | Wong | |
| 2007/0257934 A1* | 11/2007 | Doermann | G06T 3/4007 345/606 |
| 2007/0260639 A1 | 11/2007 | Tobin et al. | |
| 2007/0286486 A1* | 12/2007 | Goldstein | G06K 9/00422 382/187 |
| 2008/0060034 A1 | 3/2008 | Egnal et al. | |
| 2008/0063279 A1* | 3/2008 | Vincent | G06K 9/00463 382/182 |
| 2008/0095448 A1 | 4/2008 | Ono et al. | |
| 2008/0118146 A1 | 5/2008 | Cieplinski | |
| 2008/0144943 A1 | 6/2008 | Gokturk et al. | |
| 2008/0240618 A1 | 10/2008 | Chen et al. | |
| 2008/0273807 A1* | 11/2008 | Dauw | G06K 9/00456 382/237 |
| 2008/0298718 A1 | 12/2008 | Liu et al. | |
| 2008/0304753 A1 | 12/2008 | Sohma et al. | |
| 2009/0060352 A1* | 3/2009 | Distante | A63B 24/0021 382/224 |
| 2009/0070110 A1* | 3/2009 | Erol | G06F 17/30247 704/236 |
| 2009/0177758 A1* | 7/2009 | Banger | G06F 17/30781 709/219 |
| 2009/0254543 A1 | 10/2009 | Ber et al. | |
| 2009/0275365 A1 | 11/2009 | Lee et al. | |
| 2010/0007601 A1 | 1/2010 | Lashina et al. | |
| 2010/0080493 A1 | 4/2010 | McGatha et al. | |
| 2010/0102119 A1 | 4/2010 | Gustin et al. | |
| 2010/0166309 A1 | 7/2010 | Hull | |
| 2010/0245230 A1 | 9/2010 | Yaun | |
| 2010/0259633 A1 | 10/2010 | Kii | |
| 2011/0035662 A1 | 2/2011 | King et al. | |
| 2011/0099571 A1* | 4/2011 | Lucas | H04N 21/40 425/191 |
| 2011/0158548 A1 | 6/2011 | Aiza | |
| 2011/0255794 A1 | 10/2011 | Neogi et al. | |
| 2011/0286627 A1 | 11/2011 | Takacs et al. | |
| 2012/0019557 A1 | 1/2012 | Aronsson et al. | |
| 2012/0059914 A1* | 3/2012 | Banger | G06F 17/30781 709/219 |
| 2012/0072110 A1 | 3/2012 | Venkatraman | |
| 2012/0114249 A1 | 5/2012 | Conwell | |
| 2012/0170852 A1 | 7/2012 | Zhang et al. | |
| 2012/0179468 A1* | 7/2012 | Nestares | G06K 9/3208 704/260 |
| 2012/0190385 A1 | 7/2012 | Nair et al. | |
| 2012/0194430 A1 | 8/2012 | Kwon et al. | |
| 2012/0242842 A1 | 9/2012 | Yoshigahara et al. | |
| 2012/0245835 A1* | 9/2012 | Weitz | G08G 5/0043 701/120 |
| 2012/0310643 A1 | 12/2012 | Labsky et al. | |
| 2013/0045751 A1 | 2/2013 | Chao et al. | |
| 2013/0054576 A1 | 2/2013 | Karmarkar et al. | |
| 2013/0231852 A1 | 9/2013 | Weitz et al. | |
| 2014/0115519 A1 | 4/2014 | Ouyang et al. | |
| 2014/0304655 A1 | 10/2014 | Imoto et al. | |
| 2015/0170418 A1 | 6/2015 | Flynn et al. | |

FOREIGN PATENT DOCUMENTS

| | | |
|---|---|---|
| JP | 2004-240692 | 8/2004 |
| JP | 2006-331117 | 12/2006 |

OTHER PUBLICATIONS

Hankyu Lim & Ungmo Kim—"Word Recognition by Morphological Analysis"—Published in: Intelligent Information Systems, 1995. ANZIIS-95. Proceedings of the Third Australian and New Zealand Conference on—Date of Conference: Nov. 27, 1995—Conference Location :Perth, WA—pp. 236-241.*

USPTO Non Final Office Action dated Jan. 9, 2015; for U.S. Appl. No. 13/680,983, 18 pages.

CN Second Office Action mailed Aug. 28, 2013; in corresponding Chinese patent No. 201080008793.1.

USPTO Notice of Allowance mailed Jul. 29, 2013; in corresponding U.S. Appl. No. 13/491,398.

USPTO Notice of Allowance and Fee(s) Due mailed Feb. 4, 2014; in corresponding U.S. Appl. No. 13/429,135.

USPTO Notice of Allowance and Fee(s) Due mailed Feb. 5, 2014; in corresponding U.S. Appl. No. 12/378,599.

EP Search Report dated Jun. 6, 2013, Europe Patent Application No. 10744249,3, Jun. 6, 2013, 5 pages.

(56) References Cited

OTHER PUBLICATIONS

USPTO Final Office Acton dated Jan. 30, 2012, U.S. Appl. No. 12/378,599, 15 pages.
JP Final Office Action dated May 14, 2013, Japanese Application No. 2011-551189, 1 page.
CN First Office Action dated Feb. 1, 2013, Chinese Patent Application No. 201080008793.1, 25 pages.
PCT International Search Report dated Mar. 2, 2010, International Application No. PCT/US2010/020943, 14 pages.
PCT International Search Report dated Mar. 30, 2010, International Application No. PCT/US2010/024466, Mar. 30, 2013, 2 pages.
PCT International Search Report dated Mar. 5, 2010, International Application No. PCT/US2010/021206. Mar. 5, 2010, 2 pages.
PCT International Written Opinion dated Mar. 30, 2013, International Application No. PCT/US2010/024466, Mar. 30, 2013, 2 pages.
JP Non Final Office Action dated Jan. 8, 2013, Japanese Application No. 2011-551189, Jan. 8, 2013, 2 pages.
USPTO Non Final Office Action dated Apr. 17, 2012, U.S. Appl. No. 12/321,235, 6 pages.
USPTO Non Final Office Action dated May 7, 2012, U.S. Appl. No. 12/319,992, 19 pages.
USPTO Non Final Office Action dated Jun. 24, 2011, U.S. Appl. No. 12/378,599, 10 pages.
USPTO Non Final Office Action dated Jun. 6, 2012, U.S. Appl. No. 12/321,235, 29 pages.
USPTO Notice of Allowance dated Oct. 26, 2012, U.S. Appl. No. 12/319,992, 7 pages.
USPTO Notice of Allowance dated Nov. 29, 2012, U.S. Appl. No. 12/321,235, Nov. 29, 2012, 14 pages.
Baatz, Georges et al., "Handling Urban Location Recognition as a 2D Homothetic Problem", http://www.inf.ethz.ch/personal/pomarc/pubs/BaatzECCV1O.pdf, 14 pages.
Baumberg, Adam, "Reliable Feature Matching Across Widely Separated Views", Proceedings of Computer Vision and Pattern Recognition, vol. 1, 2000, pp. 1774-1781.
Berretti, Stefano et al., "Merging Results for Distributed Content Based Image Retrieval", Multimedia Tools and Applications, Kluwer Academic Publishers, vol. 24; No. 3, Dec. 1, 2004, pp. 215-232.
Chen, David M. et al., "City-Scale Landmark Identification on Mobile Devices", http://www.inf.ethz.ch/personal/gbaatz/papers/chen11.pdf, 8 pages.
Chen, Liang et al., "Robust Affine Invariant Feature Extraction for Image Matching", IEEE Geoscience and Remote Sensing Letters, vol. 5, No. 2, 2008, 5 pages.
Chu et al., "Image-guided tours: Fast-approximated sift with u-surf features", Technical report. Stanford University, Department of Electrical Engineering, 2007.
Fischler, Martin A. et al., "Random Sample Consensus: A Paradigm for Model Fitting with Applications to Image Analysis and Automated Cartography". Communications of the ACM, vol. 24, 1981, pp. 381-395.
Jia et al., "Photo-to-Search: Using Camera Phones to Inquire of the Surrounding World", Proceedings of the 7th International Conference on Mobile Date Management (MOM '06), 2006.
Labe, T. et al., "Automatic Relative Orientation of Images". Proceedings of the Fifth Turkish-German Joint Geodetic Days, Berlin, Germany, 2006, 6 pages.
Lowe, David G. , "Distinctive Image Features from Scale-Invariant Keypoints", Jan. 5, 2004, 28 pages.
Lowe, David G., "Distinctive Image Features from Scale-Invariant Keypoints", International Journal of Computer Vision, 2004, pp. 91-110.
Paiva, "Topological Equivalence and Similarity in Multi-Representation Geographic Databases", The University of Maine—Electronic Theses and Dissertations, 1998.
Philbin, James et al., "Object Retrieval with Large Vocabularies and Fast Spatial Matching", Proceedings of Computer Vision and Pattern Recognition, 2007, 9 pages.
Schmid, Cordelia et al., "Local Grayvalue Invariants for Image Retrieval". IEEE Transactions on Pattern Analysis and Machine Intelligence, vol. 19, May 5, 1997, pp. pp. 530-535.
Wang, Yizhou et al., "Object Recognition Using Multi-View Imaging", Signal Processing, ICSP 2008, Ninth International Conference on IEEE, Piscataway, New Jersey, Oct. 26, 2008, pp. 810-813.
Winder, Simon A. et al., "Learning Local Image Descriptors", Proceedings of Computer Vision and Pattern Recognition, 2007, 8 pages.
Zheng, Yu et al., "Distributed Architecture for Large Scale Image-Based Search", Multimedia and Expo, 2007 IEEE International Conference, Jul. 1, 2007, pp. 579-582.
US Non Final Office Action issued in U.S. Appl. No. 13/688,772 dated Mar. 12, 2014.
US Final Office Action issued in U.S. Appl. No. 13/688,772 dated Sep. 8, 2014.
US Notice of Allowance issued in U.S. Appl. No. 13/688,772 dated Feb. 6, 2015.
Songhua Xu et al.—"Boosting text extractio from biomedical images using text region detection"—Published in Biomedical Sciences and Engineering Conference (BSEC) 2011—Date of Conference: Mar. 15-17, 2011 pp. 1-4.
A conclusive methodology for rating OCR performance—Nathan E. Brener, S.C/ Iyengar and O.S. Pianykh, Article first published online: Jul. 26, 2005 Journal of the American Society for Information Science Technology, vol. 56, Issue 12, pp. 1274-1287 Oct. 2005.
"Notice of Allowance dated Jun. 5, 2016" received in U.S. Appl. No. 13/680,983.
"Non Final Office Action dated Mar. 27, 2015" received in U.S. Appl. No. 13/750,940.
"Final Office Action dated Oct. 23, 2015" received in U.S. Appl. No. 13/750,940.

\* cited by examiner

IMAGE-BASED CHARACTER RECOGNITION

CROSS-REFERENCES TO RELATED APPLICATIONS

This application is a continuation of U.S. patent application Ser. No. 13/688,772, filed on Nov. 29, 2012, now U.S. Pat. No. 9,043,349 B1, issued May 26, 2015, of which the full disclosure of this application is incorporated herein by reference for all purposes.

BACKGROUND

Optical character recognition (OCR) systems are generally used to detect text present in an image and to convert the detected text into its equivalent electronic representation. In order to accurately recognize text with a conventional OCR engine, the image typically needs to be of a high quality. The quality of the image depends on various factors such as the power of the lens, light intensity variation, relative motion between the camera and text, focus, and so forth. Generally, an OCR engine can detect a majority of text characters in good quality images, such as images having uniform intensity, no relative motion, and good focus. However, even with good quality images, conventional OCR engines are still often unable to accurately detect all text characters. This imprecision is further exacerbated when attempting to recognize text from lesser quality images, such as images containing variations in lighting, shadows, contrast, glare, blur, and the like. As technology advances and as people are increasingly using portable computing devices in a wider variety of ways, it can be advantageous to adapt the ways in which images are processed by an OCR engine in order to improve text recognition precision.

BRIEF DESCRIPTION OF THE DRAWINGS

Various embodiments in accordance with the present disclosure will be described with reference to the drawings, in which.

DETAILED DESCRIPTION

Figure 1:
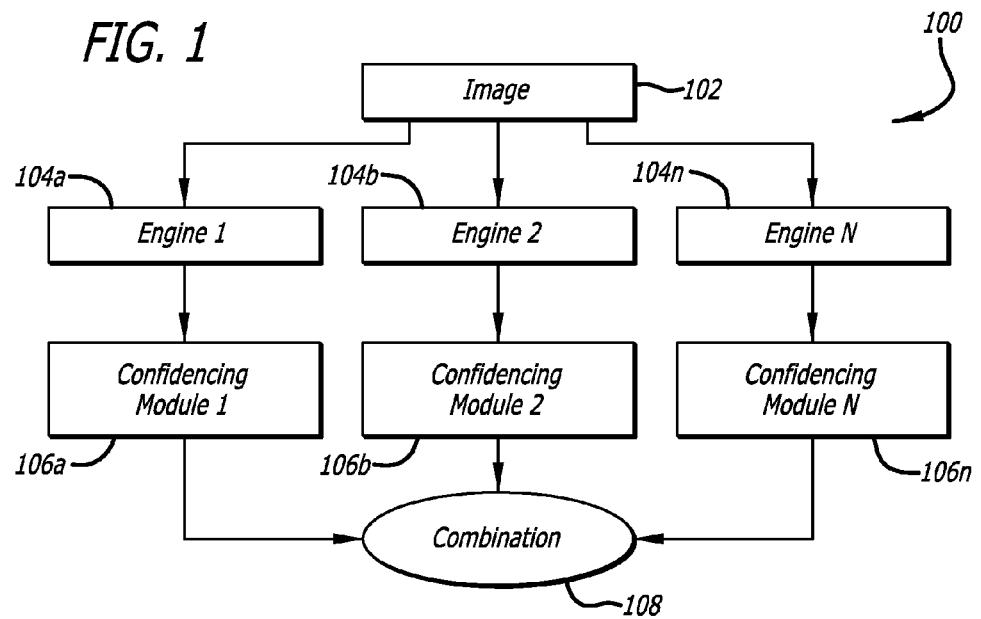
FIG. 1 illustrates an example visual representation of a process of recognizing text in accordance with at least one embodiment.

Systems and methods in accordance with various embodiments of the present disclosure may overcome one or more of the aforementioned and other deficiencies experienced in conventional approaches to recognizing text in an image. In particular, various approaches enable a device to perform tasks such as processing an image to recognize and locate text in the image, and providing the recognized text an application executing on the device for performing a function (e.g., calling a number, opening an internet browser, etc.) associated with the recognized text. In at least one embodiment, processing the image includes substantially simultaneously or concurrently processing the image with at least two recognition engines, such as at least two optical character recognition (OCR) engines, running in a multithreaded mode. In at least one embodiment, the recognition engines can be tuned so that their respective processing speeds are roughly the same. Utilizing multiple recognition engines enables processing latency to be close to that of using only one recognition engine.

In at least one embodiment, recognized text from each recognition engine goes through a confidencing module, which determines the probability associated with the accuracy of the recognized text. In order to determine the probability or confidence score, the confidencing module may take into account various attributes. For example, determining that a string of text corresponds to a word in a dictionary will increase the recognized text's confidence score. If the word contains incoherent patterns, such as a high frequency of repeating the same character and the like, the presence of those patterns will decrease the recognized text's confidence score.

After the confidence scores for the recognized text have been determined, a component such as a combination module determines a consensus string of text that is a compilation of the recognized text from each recognition engine weighted by their respective confidence scores. In order to accomplish this, a correspondence between the recognized text from each recognition engine is established. In this example, each engine will report coordinates of a bounding box for the recognized text. The bounding box for the recognized text is then used to align the recognized text from each recognition engine to determine the correspondence. An overlap percentage of the bounding boxes can be used to map recognized text from one recognition engine to recognized text from another recognition engine, for example. Each combined word or sting within the recognized text then is assigned a final confidence score based on a combination function, such as a linear function, that is a combination of each recognition engine weighted by their respective confidence scores and/or past recognition accuracy. Further, text can be recognized by comparing multiple images or image frames that include the same text.

In at least one embodiment, image capture can be performed using a single image, multiple images, periodic imaging, continuous image capturing, image streaming, and the like. For example, the computing device can capture multiple images (or video) of text in a continuous mode and provide at least a portion of the same to the recognition engines to separately recognize text from multiple images. The multiple OCR outputs corresponding to recognized text from the multiple images can then be compared to either verify image details or to capture details that have been obscured or missed in one image or frame. In another example, a single image can be provided to the recognition engines either in real-time or at a later time compared to when the image was captured, such as a previously captured image stored in a photo gallery. Accordingly, at least a portion of these tasks can be performed on a portable computing device or using at least one resource available across a network as well.

Various other functions and advantages are described and suggested below as may be provided in accordance with the various embodiments.

FIG. 1 illustrates an example visual representation of a process 100 of recognizing text in accordance with at least one embodiment. In various embodiments, an image 102 is obtained and may undergo various preprocessing techniques. A processing component processes the image to detect text in the image 102. For example, the processing component can implement algorithms that detect and recognize the location of text in the image 102, and the region of the image 102 that includes the text can be selected or cropped to remove irrelevant portions of the image 102 and to highlight relevant regions containing text. The relevant regions can be binarized, and, thereafter, provided or communicated to a server. Alternatively, in accordance with at least one embodiment, a grey scale image, color image or any other image (selected/cropped or otherwise not selected/cropped) can be communicated to the server (or remain on the portable computing device) for further processing.

In various embodiments, detecting text in the image 102 can include locating regions of extremes (e.g., regions of sharp transitions between pixel values) such as the edges of letters. The regions of extremes, or the maximally stable extremal regions, can be extracted and analyzed to detect characters, where the detected characters can be connected and/or aggregated. A text line algorithm can be used to determine the orientation of the connected characters, and once the orientation of the characters is determined, a binary mask of the region containing the characters can be extracted. The binary mask can be converted into a black white representation, and the black white representation can be communicated to an optical character recognition engine (OCR) or other text recognition engine for further processing. In accordance with various embodiments, the binary mask is provided to a first recognition engine 104a, a second recognition engine 104b, and an $n^{th}$ recognition engine 104n for concurrent character recognition processing in a multithreaded mode. In at least one embodiment, each recognition engine (104a, 104b, 104n) is tuned so that their respective processing speeds are roughly the same to within an allowable or reasonable deviation. Tuning the processing speeds of the recognition engines (104a, 104b, 104n) enables processing latency to be close to that of using only one recognition engine, in at least one example.

After text is recognized by recognition engines (104a, 104b, 104n), the recognized text is assigned a confidence score. In at least one embodiment, the recognized text from each recognition engine (104a, 104b, 104n) goes through a respective confidencing module (106a, 106b, 106n), which determine a probability associated with the accuracy of the recognized text. The confidencing modules (106a, 106b, 106n) do not know whether any word or character is correct or not and, therefore, a confidence score is assigned thereto. In one example, in order to determine a respective confidence score, each respective confidencing module (106a, 106b, 106n) includes a conversion table based on the statistical analysis of comparing testing results against the ground truth of one or more training sets of known text. The conversion table is then used to determine the confidence score for future unknown text from an image. Various other approaches for determining confidence can be used as well as discussed or suggested elsewhere herein.

In at least one embodiment, the confidencing modules (106a, 106b, 106n) can calculate confidence scores for each detected character, which can then be extended to each word or page. In at least one example, the confidencing modules (106a, 106b, 106n) use algorithms either associated with the recognition engine (104a, 104b, 104n) or as an external customized process. The confidence scores can vary between different recognition engines depending on a number of different variables including the font style, font size, whether the text is bolded, underlined, or italicized, and the like. Further, the confidencing modules (106a, 106b, 106n) may take various other attributes into account. For example, determining whether a string of text is a word in a dictionary can increase the recognized text's confidence score or, if the word contains incoherent patterns, such as a high frequency of repeating the same character and the like, will decrease the recognized text's confidence score.

After the confidence scores for the recognized text have been determined, a combination module 108 determines a consensus string of text that is a compilation of the recognized text from each recognition engine (104a, 104b, 104n) weighted by their respective confidence scores. In order to accomplish this, a correspondence between the recognized text from each recognition engine (104a, 104b, 104n) is established. In this example, each engine (104a, 104b, 104n) will report coordinates of a bounding box for the recognized text. The bounding box for the recognized text is then used to align the recognized text from each recognition engine (104a, 104b, 104n) to determine a correspondence. An overlap percentage of the bounding boxes can be used to map recognized text from one recognition engine to recognized text from another recognition engine. If the recognized text received from each recognition engine (104a, 104b, 104n) is not identical, then each word within the recognized text is assigned a final confidence score based a combination function, such as a linear function, that is a combination of each recognition engine weighted by a respective confidence score. Other factors, such as past performance of a particular engine can also be factored into the weighting or linear function. Thereafter, the recognized text with the highest final confidence score is selected and can be subsequently used by an application, for example, as input for a search engine or other application.

Figure 2:
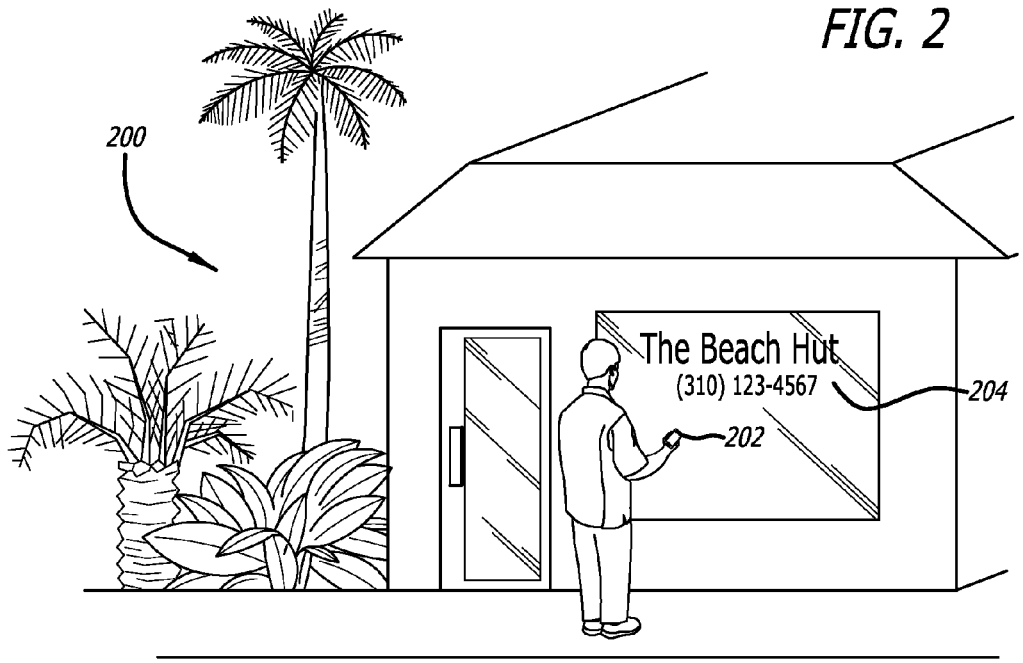
FIG. 2 illustrates an example situation where a user is attempting to recognize text with a computing device in accordance with various embodiments.

FIG. 2 illustrates an example situation 200 in which a user is attempting to recognize text on a window 204 of a business. Although a smart phone is shown, it should be understood that various other types of electronic or computing devices that are capable of determining and processing input can be used in accordance with various embodiments discussed herein. These devices can include, for example, tablet computers, notebook computers, desktop computers, personal data assistants, electronic book readers, video gaming controllers, and portable media players, among others. In accordance with various embodiments, instead of manually typing the phone number to call the business or manually typing the business name into a search engine of device's web browser, the user walking down a street could point the camera of the computing device 202 at the text to recognize and subsequently provide the text to the phone application to initiate a call or to the browser as a shortcut to navigate the user thereto.

In this example, however, since the user is walking, obtaining an accurate OCR output can be a challenge. The outside world is filled with less than ideal conditions, such as poor or varied lighting, movement during image capture, and other circumstances, that make capturing an image ideal for processing by a conventional optical character recognizer (OCR) difficult. Further, given people's busy schedules, taking the time and care to capture an ideal image in a moving environment, such as in a user's hand, is not necessarily practical and likely not to be expected. Since different algorithms and recognition engines have different strengths and weaknesses, it can be advantageous to integrate information from multiple recognition engines.

Figure 3:
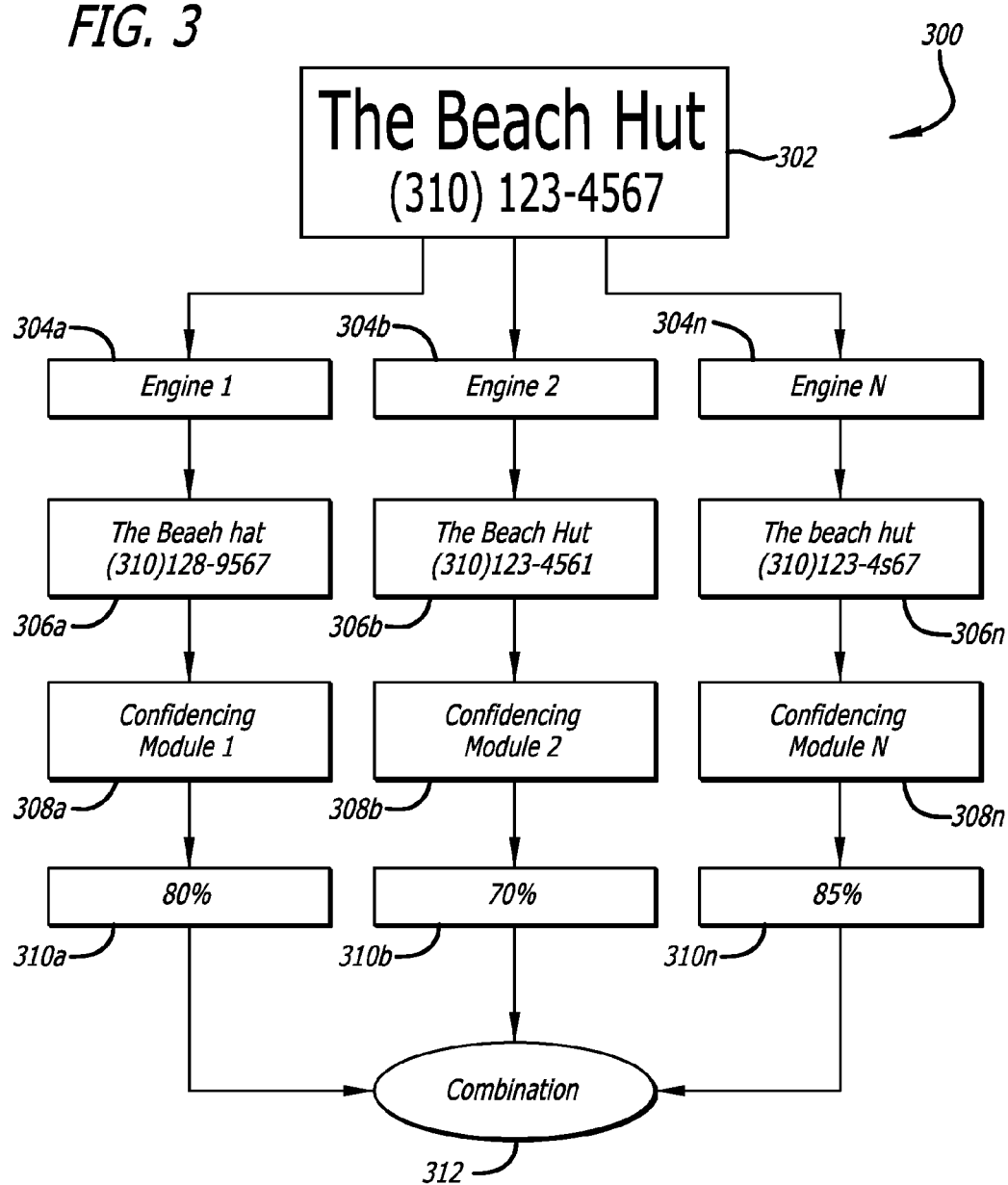
FIG. 3 illustrates another example visual representation of a process of recognizing text in accordance with at least one embodiment.

FIG. 3 illustrates an example visual representation of a process 300 of recognizing text in accordance with at least one embodiment. In this example, an image 302 captured by the user from FIG. 2 is communicated to three recognition engines (304a, 304b, 304n) for simultaneous or concurrent processing. In this example, the recognized text (306a, 306b, 306n) from each of the three recognition engines (304a, 304b, 304n) is slightly different for the same input image 302 based on differences in the recognition algorithm, for example. In this example, the recognized text (306a, 306b, 306n) from each recognition engine (304a, 304b, 304n) is run through confidencing modules (308a, 308b, 308n) to determine a probability or confidence score associated with the accuracy of the recognized text. In this example, the three recognition engines (304a, 304b, 304n) have determined confidence values (310a, 310b, 310n) of 0.80, 0.70, and 0.85 for their respective recognized text from the image 302. In at least one embodiment, a consensus string of text is selected in a combination step 312 based on a function, such as a linear combination of the recognized text (306a, 306b, 306n) weighted by their confidence values (310a, 310b, 310n). Other weighting factors can also be applied to the function. For example, the first recognition engine 304a includes more errors or misreads than the second recognition engine 304b that has only one error. If the first recognition engine 304a continually provides confidence scores higher than other recognition engines that have fewer errors, the weight of the first recognition engine 304a can be discounted. Conversely, if a recognition engine continually provides lower confidence scores relative to other, less accurate, recognition engines, that recognition engine can be weighted higher or the others could be discounted, for example.

Figure 4:
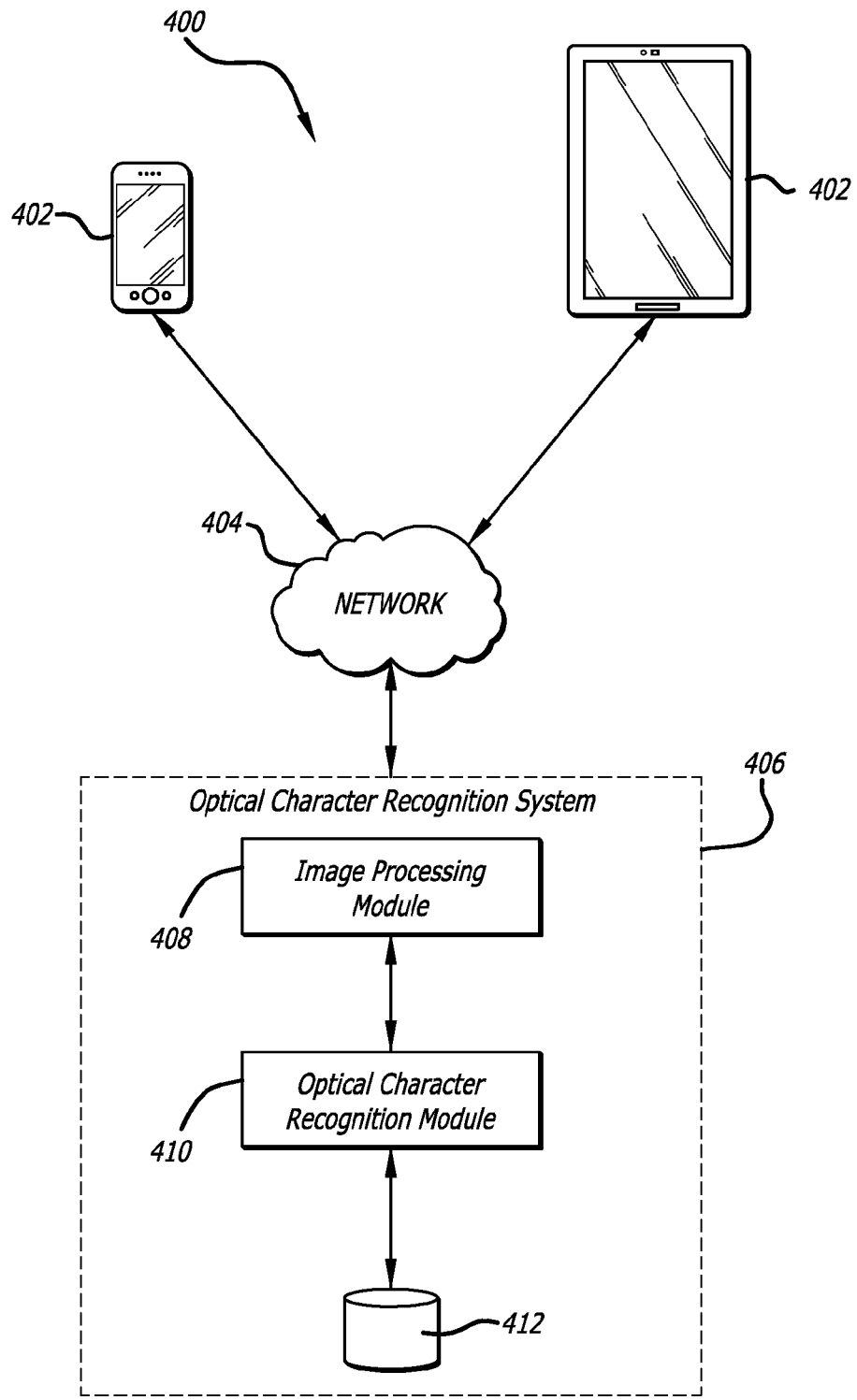
FIG. 4 illustrates an example environment in which various embodiments can be implemented.

FIG. 4 is an example environment 400 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to utilize a client device 402, such as a personal computer, tablet computer, smart phone, and the like, to access an Optical Character Recognition system or service 406 over at least one appropriate network 404, such as a cellular network, the Internet, or another such network for communicating digital information. The client device 402 can capture one or more images (or video) of text and send the images to the Optical Character Recognition system or service 406 over the at least one appropriate network 404. The Optical Character Recognition system 406 includes an image-processing module 408 that can apply different operators or techniques to pre-process the images before submitting the images to one or more optical character recognition modules 410. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition module 410 concurrently recognizes text from the image to produce multiple recognized text outputs. In at least one embodiment, a processor can analyze the recognized text using a database 412 of words in order to improve the recognition. The database 412 includes a set of words which the processor can search for matches corresponding to words present in the recognized text. At least a portion of these tasks can be performed on a portable computing device or by using at least one resource available across a network as well. In at least some embodiments, an OCR application will be installed on the client device 402, such that much of the processing, analyzing, or other such aspects can be executed on the client device. Various processing steps can be performed by the client device 402, by the Optical Character Recognition system 406, or a combination thereof. Therefore, it should be understood that the components and capabilities of the Optical Character Recognition system 406 could wholly or partly reside on the client device 402.

Figure 5:
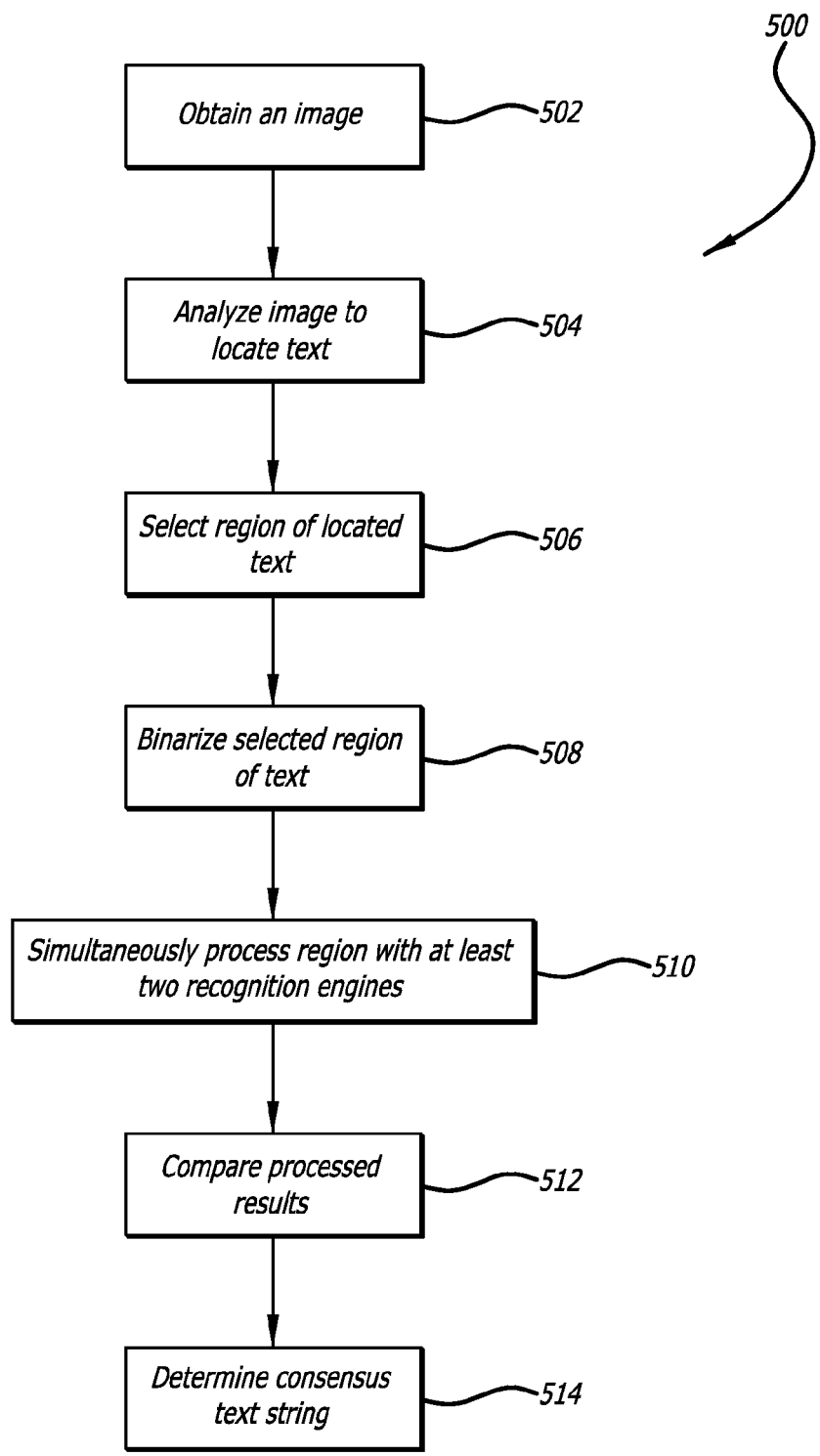
FIG. 5 illustrates an example process of recognizing text in accordance with at least one embodiment.

FIG. 5 illustrates an example process 500 for recognizing text in an image with a computing device that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image captured by a camera of a computing device is obtained 502. In this and other examples, the images could undergo and pre-processing stage including the application of various algorithms to remove certain aspects of the image in order to be more reliably read by the recognition engines. In at least one embodiment, if an image frame is out of focus, an image sharpening algorithm, such as an unsharp masking algorithm, can be applied to improve the image quality before the image is sent to the recognition engine. In at least one embodiment, a user could also be notified or alerted when the images the user is capturing are of low quality, as may be due to movement, for example, and the computing device could guide the user to keep the camera still or otherwise instruct the user while capturing an image to improve the image quality. In this example, the image is analyzed to locate a region of text therein 504. In this example, the region of text is binarized 506. The text of the binarized region of text is then concurrently recognized with a first recognition engine and at least a second recognition engine 508. Further, the recognition engines may return associated bounding boxes for each string of characters within the recognized text. In this example, a confidence score for the recognized text is determined from the first recognition engine and the at least a second recognition engine 510. Based at least in part on a combination function of the confidence scores, a consensus string of text is generated 512. In this example, the consensus string is provided either for display or for use by an application, for a user of the computing device. Various other approaches for determining confidence can be used as well as discussed or suggested elsewhere herein.

In an augmented reality (AR) application, a computing device can be trained to be interested in actionable text entity types, such as phone numbers, URLs, and email addresses. For example, if a string appears to be a phone number (based on the number and percentage of the digits in the string certain characters will be replaced based collected confusion patterns, such Z→2, O→0, and so on. The recognized text can then be provided to an application executing on the computing device corresponding to the text entity type for use by the application. In the example above, based on the pattern, the computing device can determine that the test entity type is a phone number, recognize the text using the recognition process described above, and provide the number to a phone application for calling the number. Other text entity types can also be used as described or suggested elsewhere herein.

Since a camera can capture multiple frames of a target in a continuous manner, multiple image frames can be combined to increase accuracy of the recognized text from the recognition engines. For example, multiple outputs from each recognition engine corresponding to multiple images can be compared to either verify image details or to capture details that have been obscured or are missing in one image or frame. A word's confidence score, for example, can be a function, such as a summation, of individual image frame scores from multiple images. Once an accumulated score of a word passes a certain threshold or a certain time lapses without any text exceeding a desired score threshold, for example, the text can be presented to the user or relevant application.

Further, multiple image frames can be sent to the recognition engines at the same time or a single image can be sent and, if the confidence scores from the recognized text for a respective image is below a determined threshold, a subsequent image can be sent and processed. In the later example, a controller can continue to process additional images until a cumulative confidence score for the images reaches a level above the determined threshold. For example, if the determined threshold is 0.80 and the confidence of a first image frame is 0.55, the controller have a second image frame processed. In this example, if the confidence score for a combination function or summation of the first and second image frames still does not at least equal 0.80, a third image frame can be processed. Therefore, in one example, a computing device can send a server a single image to be processed by the recognition engines and, upon returning a confidence score below the threshold, the computing can send a second image for processing. Accordingly, subsequent image frames can be processed until the cumulative confidence score at least equals the predetermined threshold. In this example, the first, second, and third image frames could be adjacent frames or they could be spaced apart by any number of frames, such as having 10, 50, or 100 frames between depending on factors such as frame rate.

In a continuous image capture and processing mode, since information for a target string of text can be verified across multiple images, preprocessing techniques may not be necessary to efficiently and effectively recognize the text. In a non-continuous mode, however, where a single image is provided to the recognition engines, for example, preprocessing will be more important since there are not multiple frames to cross-reference therewith and as much accurate information must be extracted from the single image as possible. In either of these cases, a controller can determine the appropriate amount of preprocessing for a given situation.

Further, detecting text in an image can include more or fewer steps as described above. For example, text detection in the image can include performing glyph detection on the image. The image can be separated into regions of similar grayscale values that fall within predefined size constraints called glyphs. Character classification can then be performed, where any glyphs that are not characters are removed using machine learning algorithms or other similar algorithms. Pair finding/word finding can then be performed, where the glyphs are grouped into words and lines, and baseline estimation can then be performed on the words and lines to estimate lines for the top and bottom points on the words. Word splitting can then be performed, where the spaces between the glyphs can be examined to decide word boundaries used for evaluation or display purposes. Binarization can then be performed, where the regions are binarized to produce a crisp mask which can include any punctuation that may have been filtered out earlier due to the minimum size constraint, for example.

Glyph detection can further include extracting maximally stable extremal (MSERs) regions from the image. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than three child regions, should be ignored.

Character classification can further include extracting features from each MSER, the features including: Bounding Box Aspect Ratio (width over height); Compactness (4 pi times area over perimeter squared); Raw Compactness (4 pi times number of pixels over perimeter squared); Stroke Width (estimated using distance transform) divided by width; Stroke Width (estimated using distance transform) divided by height; Solidity (area over bounding box area); Convexity (convex hull perimeter over perimeter); Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (ie. a low false negative rate), but with a high false positive rate.

Further, pair finding can include sorting the remaining glyphs (MSERs which appear to be characters) left to right, and all pairs which pass a test can be considered a possible character pair. The test compares the distance between glyphs, vertical overlap of two glyphs, their relative height, width, stroke width, and intensity.

Accordingly, word line finding can further include treating each glyph as a vertex in a graph and each pair as an edge, then using an iterative dynamic programming algorithm to extract the best (e.g., the longest) sequence of edges, where the longest edges become word candidates. Additionally or alternatively, word line finding can include selecting glyphs from left to right after three glyphs are found to be in a good sequence.

Base line estimation can further include estimating the slope of the baseline using a clustering algorithm, then computing intercepts that minimize the minimum distance between baselines and glyphs. Each word candidate can have at least two lines in the top and bottom points of the glyphs, and if two or more words appear to have the same baselines, they can be merged and the lines can be re-estimated. Further, in accordance with an embodiment, glyph refinement can be performed after baseline estimation is performed, where all glyphs that are classified as non-text, but fit into the baseline configuration, are included.

In accordance with an embodiment, word splitting can further include estimating the spaces between glyphs in each baseline and choosing a threshold, where any gap between characters greater than that threshold can be considered to be a word boundary (space) and can be marked as such.

In accordance with an embodiment, binarization can further include binarizing each region in the bounding box based at least in part on the threshold used to compute the regions character and the regions character's neighbors.

Figures 6A, 6B:
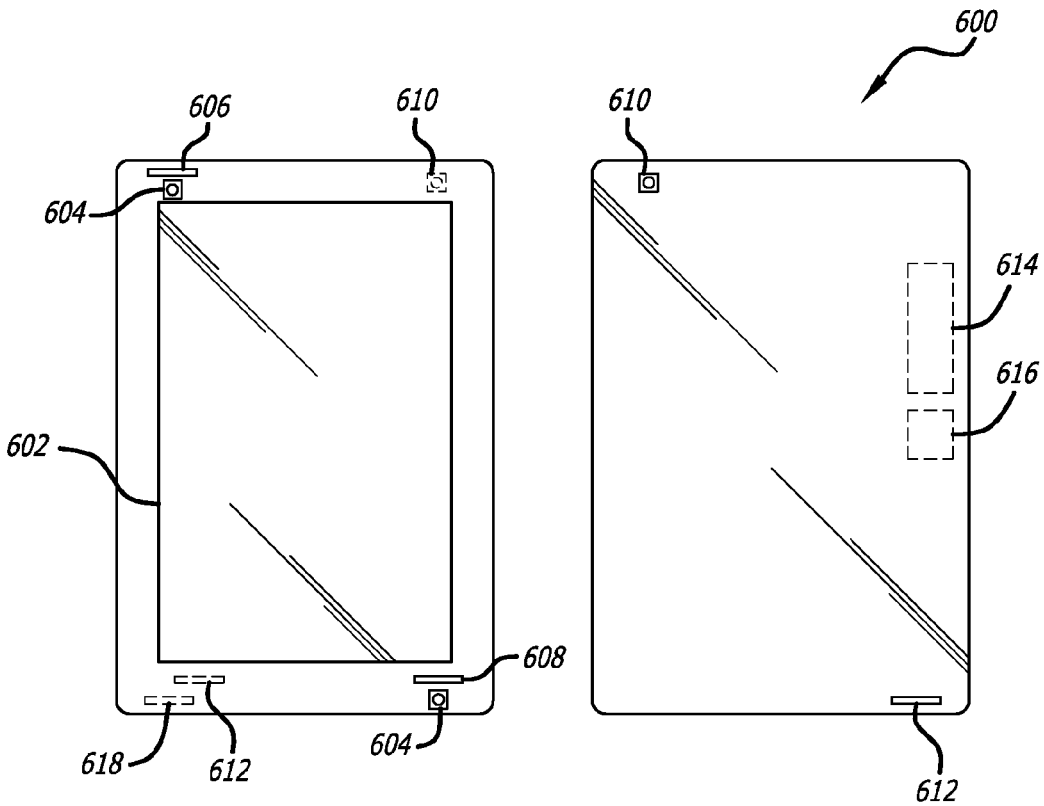
FIGS. 6A and 6B illustrate an example computing device that can be used to implement aspects of various embodiments.

FIGS. 6A and 6B illustrate front and back views, respectively, of an example electronic computing device 600 that can be used capture images and at least facilitate the recognition of text therein, in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
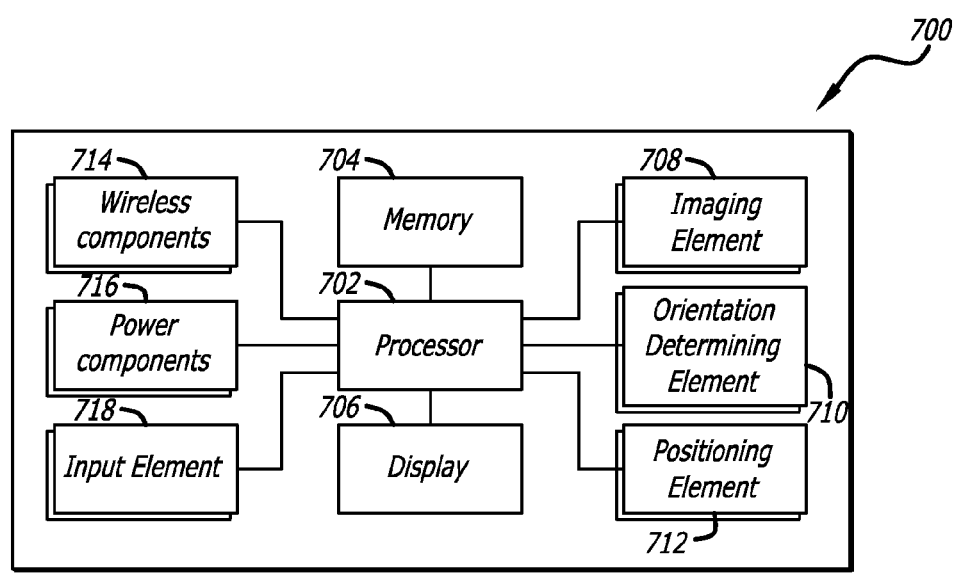
FIG. 7 illustrates example components that can be used with a device such as that illustrated in FIGS. 6A and 6B.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, text, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
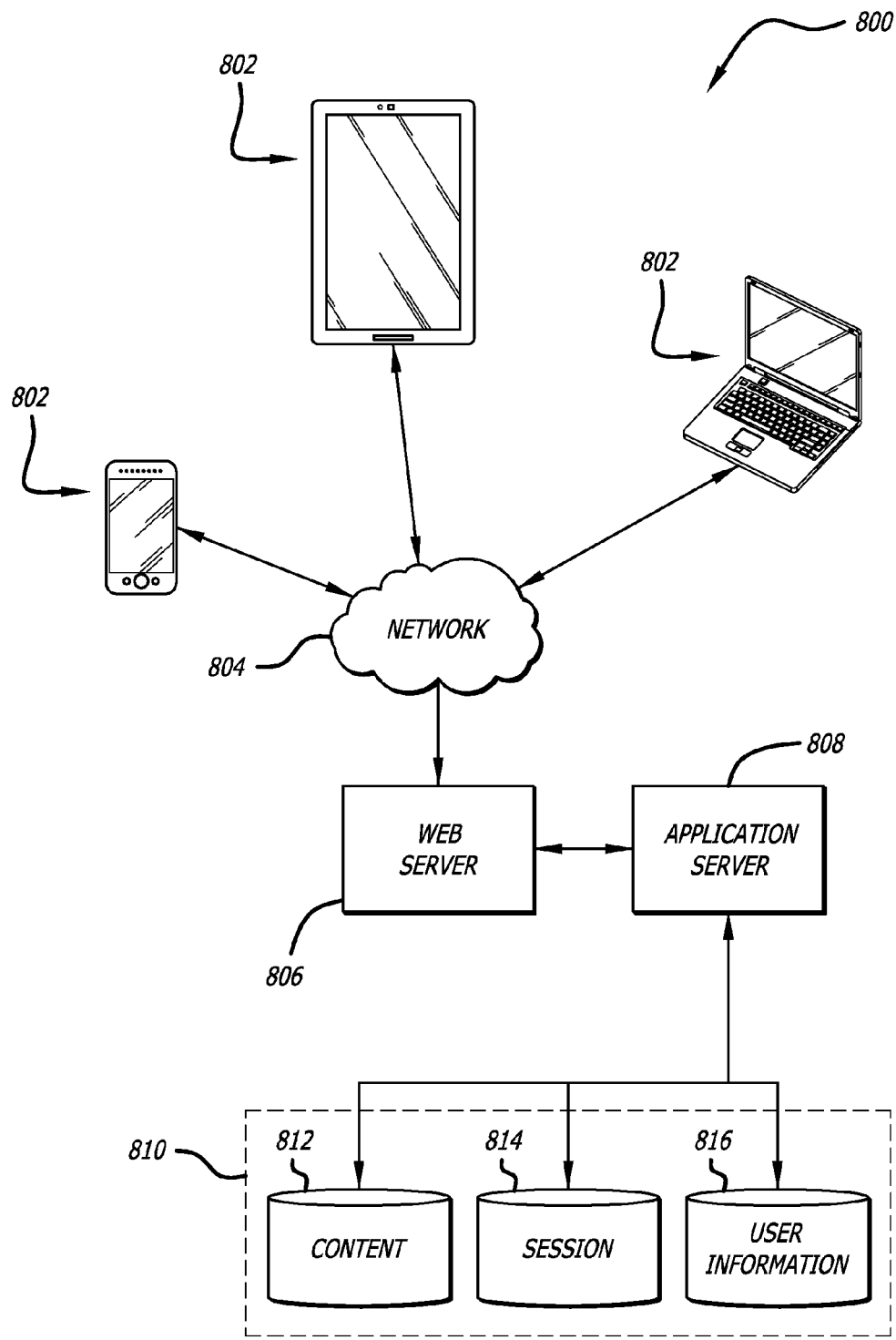
FIG. 8 illustrates another example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections.

However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining an image captured by a camera of a computing device;
analyzing the image to locate a region of text represented in the image;
binarizing the region of text to generate a binarized region;
recognizing text of the binarized region with a first optical character recognition (OCR) engine and a second (OCR) engine to identify first recognized text and second recognized text;
tuning a first processing speed associated with the first (OCR) engine and a second processing speed associated with the second OCR engine such that the first processing speed and the second processing speed are equal to within a predefined deviation;
determining a first confidence score for the first recognized text and a second confidence score for the second recognized text by:
searching a database for matching words within the first recognized text and the second recognized text;

increasing the first confidence score for the first recognized text based on matching a string of characters in the first recognized text or the second recognized text to at least one first word in the database; and increasing the second confidence for the second recognized text based on matching a second string of characters in the second recognized text to at least one of the first word or a second word in the database; and applying a combination function of the first confidence score and the second confidence score to generate a consensus string of text, the consensus string of text comprising at least a portion of at least one of the first recognized text or the second recognized text.

2. The computer-implemented method of claim 1, wherein the first processing speed and the second processing speed are tuned to reduce a processing latency associated with a combination of the first OCR engine and the second OCR engine.

3. The computer-implemented method of claim 1, further comprising:
determining that the combination function of the first confidence score and the second confidence score is below a threshold; and
processing the binarized region with a third OCR engine.

4. The computer-implemented method of claim 1, further comprising:
applying a first bounding box to the binarized region;
applying a second bounding box to the binarized region; and
aligning the first bounding box of the first recognized text from the first OCR engine with the second bounding box of the second recognized text from the at least a second OCR engine.

5. A computer-implemented method, comprising:
analyzing an image to locate a region of text in the image;
selecting a subset of the image associated with the region of text represented in the image;
the subset of the image to generate a binarized region;
tuning a first processing speed associated with a first optical character recognition (OCR) engine and a second processing speed associated with a second OCR engine such that the first processing speed and the second processing speed are equal to within a predefined deviation;
recognizing the text represented in the image with the first OCR engine to yield a first recognized text;
recognizing the text represented in the image with the second OCR engine to yield a second recognized text, the first OCR engine being different relative to the second OCR engine;
determining a first confidence score for the first recognized text and a second confidence score for the second recognized text by:
searching a database for matching words within the first recognized text and the second recognized text;
increasing the first confidence score for the first recognized text based on matching a string of characters in the first recognized text or the second recognized text to at least one first word in the database; and
increasing the second confidence for the second recognized text based on matching a second string of characters in the second recognized text to at least one of the first word or a second word in the database; and
applying a combination function of the first confidence score and the second confidence score to generate a consensus string of text comprising at least a portion of at least one of the first recognized text from the first OCR engine or the second recognized text from the second OCR engine.

6. The computer-implemented method of claim 5, further comprising:
recognizing second text represented in a second image with the first OCR engine to yield a third recognized text;
recognizing the second text in the second image with the second OCR engine to yield fourth recognized text;
determining a third confidence score for the third recognized text from the first OCR engine and a fourth confidence score for the fourth recognized text from the second OCR engine; and
applying a combination function of the first confidence score, the second confidence score, the third confidence score, and the fourth confidence score to generate the consensus string of text comprising at least a portion of at least one of the first recognized text, the second recognized text, the third recognized text, or the fourth recognized text.

7. The computer-implemented method of claim 5, wherein the first processing speed and the second processing speed are tuned to reduce a processing latency associated with a combination of the first OCR engine and the second OCR engine.

8. The computer-implemented method of claim 5, further comprising:
determining that the combination function of the first confidence score and the second confidence score is below a threshold; and
processing the binarized region with a third OCR engine.

9. The computer-implemented method of claim 5, further comprising:
applying a first bounding box to the binarized region;
applying a second bounding box to the binarized region; and
aligning the first bounding box of the first recognized text from the first OCR engine with the second bounding box of the second recognized text from the second OCR engine.

10. The computer-implemented method of claim 5, wherein the image is captured by at least one camera of a portable computing device.

11. The computer-implemented method of claim 5, further comprising:
communicating the binarized region to the first OCR engine and the second OCR engine.

12. A computing device, comprising:
a processor;
a display screen; and
memory including instructions that, when executed by the processor, cause the computing device to:
analyze an image to locate a region of text in the image;
select a subset of the image associated with the region of text represented in the image;
binarize the subset of the image to generate a binarized region;
tune a first processing speed associated with a first OCR engine and a second processing speed associated with a second OCR engine such that the first processing speed and the second processing speed are equal to within a predefined deviation;
recognize the text represented in the image with the first OCR engine to yield a first recognized text;
recognize the text represented in the image with the second OCR engine to yield a second recognized text, the first OCR engine being different relative to the second OCR engine;

determine a first confidence score for the first recognized text and a second confidence score for the second recognized text by:
  searching a database for matching words within the first recognized text and the second recognized text;
  increasing the first confidence score for the first recognized text based on matching a string of characters in the first recognized text or the second recognized text to at least one first word in the database; and
  increasing the second confidence for the second recognized text based on matching a second string of characters in the second recognized text to at least one of the first word or a second word in the database; and
apply a combination function of the first confidence score and the second confidence score to generate a consensus string of text comprising at least a portion of at least one of the first recognized text from the first OCR engine or the second recognized text from the second OCR engine.

13. The computing device of claim 12, wherein the memory includes instructions that, when executed by the processor, further cause the computing device to:
  recognize second text represented in a second image with the first OCR engine to yield a third recognized text;
  recognize the second text represented in the second image with the second OCR engine to yield fourth recognized text;
  determine a third confidence score for the third recognized text from the first OCR engine and a fourth confidence score for the fourth recognized text from the second OCR engine; and
  apply a combination function of the first confidence score, the second confidence score, the third confidence score, and the fourth confidence score to generate the consensus string of text comprising at least a portion of at least one of the first recognized text, the second recognized text, the third recognized text, or the fourth recognized text.

14. The computing device of claim 12, wherein the first processing speed and the second processing speed are tuned to reduce a processing latency associated with a combination of the first OCR engine and the second OCR engine.

15. The computing device of claim 12, wherein the memory includes instructions that, when executed by the processor, further cause the computing device to:
  determining that the combination function of the first confidence score and the second confidence score is below a threshold; and
  processing the binarized region with a third OCR engine.

16. The computing device of claim 12, wherein the memory includes instructions that, when executed by the processor, further cause the computing device to:
  apply a first bounding box to the binarized region; apply a second bounding box to the binarized region; and
  align the first bounding box of the first recognized text from the first OCR engine with the second bounding box of the second recognized text from the second OCR engine.

17. The computing device of claim 12, further comprising at least one camera that captures the image in a capture mode, the capture mode including at least one of a single image capture mode, a multiple image capture mode, a periodic imaging capture mode, a continuous image capturing mode, and an image streaming capture mode.

* * * * *